United States Patent
Baldwin et al.

(10) Patent No.: US 7,103,635 B2
(45) Date of Patent: Sep. 5, 2006

(54) REALLY SIMPLE MAIL TRANSPORT PROTOCOL

(75) Inventors: Michael Scott Baldwin, Montclair, NJ (US); Geoffrey Allen Collyer, Oakland, CA (US); Gregory P. Kochanski, Dunellen, NJ (US); Paul C. Lustgarten, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 767 days.

(21) Appl. No.: 09/770,135

(22) Filed: Jan. 26, 2001

(65) Prior Publication Data

US 2002/0004820 A1   Jan. 10, 2002

Related U.S. Application Data

(60) Provisional application No. 60/178,597, filed on Jan. 28, 2000.

(51) Int. Cl.
*G06F 15/16* (2006.01)

(52) U.S. Cl. ............................ 709/206; 709/237
(58) Field of Classification Search ............... 709/206, 709/248, 237
See application file for complete search history.

(56) References Cited

U.S. PATENT DOCUMENTS

| | | | | |
|---|---|---|---|---|
| 5,257,369 A * | 10/1993 | Skeen et al. | ................. | 719/312 |
| 5,333,266 A * | 7/1994 | Boaz et al. | ................. | 709/206 |
| 5,383,203 A * | 1/1995 | Miyazono | ................. | 714/785 |
| 5,463,620 A * | 10/1995 | Sriram | ................. | 370/412 |
| 5,539,750 A * | 7/1996 | Kivi-Mannila et al. | ..... | 370/506 |
| 5,583,993 A * | 12/1996 | Foster et al. | ................. | 709/205 |
| 5,657,390 A * | 8/1997 | Elgamal et al. | ............. | 713/151 |
| 5,699,517 A * | 12/1997 | Yamasaki | ................. | 709/203 |
| 5,758,088 A * | 5/1998 | Bezaire et al. | ............. | 709/232 |
| 5,764,241 A * | 6/1998 | Elliott et al. | ................. | 345/473 |
| 5,768,505 A * | 6/1998 | Gilchrist et al. | ............ | 709/201 |
| 5,841,966 A * | 11/1998 | Irribarren | .................... | 709/206 |
| 5,948,066 A * | 9/1999 | Whalen et al. | ............. | 709/229 |
| 5,958,015 A * | 9/1999 | Dascalu | ...................... | 709/229 |
| 5,974,310 A * | 10/1999 | Bilgic | ......................... | 455/418 |
| 6,006,269 A * | 12/1999 | Phaal | ......................... | 709/227 |
| 6,035,327 A * | 3/2000 | Buckley et al. | ............. | 709/206 |
| 6,134,432 A * | 10/2000 | Holmes et al. | .......... | 455/412.1 |
| 6,161,203 A * | 12/2000 | Zuranski et al. | ............ | 714/707 |
| 6,215,769 B1* | 4/2001 | Ghani et al. | ................. | 370/230 |
| 6,658,456 B1* | 12/2003 | Shimoosawa | ............... | 709/206 |
| 6,675,196 B1* | 1/2004 | Kronz | ......................... | 709/203 |
| 6,680,946 B1* | 1/2004 | Isoyama et al. | ....... | 370/395.61 |
| 6,707,472 B1* | 3/2004 | Grauman | ...................... | 715/752 |
| 6,993,563 B1* | 1/2006 | Lytle et al. | ................. | 709/206 |
| 2002/0120697 A1* | 8/2002 | Generous et al. | .......... | 709/206 |

(Continued)

OTHER PUBLICATIONS

Fielding, R.; Gettys, J.; Mogul, J.; Frystyk J.; Berners-Lee, T. RFC 2068 (RFC2068). Network Working Group. Jan. 1997.*

(Continued)

*Primary Examiner*—Beatriz Prieto
*Assistant Examiner*—Michael D. Meucci

(57) ABSTRACT

A new mail transport protocol is proposed for use over a reliable byte-stream transport. This protocol is faster, simpler and more streaming than prior methods, and handles binary and unicode data more efficiently. The protocol requires fewer communication round trips between servers per message transferred than existing methods. It transmits and receives byte data as is without requiring further per-byte processing on advanced operating systems such as UNIX, and requires only new-line processing in text on legacy operating systems.

13 Claims, 2 Drawing Sheets

U.S. PATENT DOCUMENTS

2002/0144154 A1* 10/2002 Tomkow ..................... 713/201
2002/0178360 A1* 11/2002 Wenocur et al. ............ 713/170

OTHER PUBLICATIONS

Richardson, Christopher. Linux Qmail+MH mini-HOWTO (part 1/1). Google Group comp.os.linux.answers. Jan. 7, 1998.*
Freed, N; Borenstein. RFC 2045 (RFC2045). Network Working Group. Nov. 1996.*
Khare, Rohit. The spec's in the mail. Internet Computing, IEEE, vol. 2, Issue 5. Sep.-Oct. 1998. pp. 82-86.*
Batista, T.V.; Rodriguez, N.L.R.; Soares, L.F.G.; Resende, M.C.; Hypermedia mail over WWW. Community Networking, 1996. Proceedings., 3rd International Workshop on, May 23-24, 1996. pp. 83-89.*
Ahrens, A.; Greiner, G.; A Radio Protocol for TCP/IP Application. Frequency Selection and Management Techniques for HF Communications (Ref. No. 1999/017), IEE Colloquium on , Mar. 29-30, 1999. pp. 11/1-11/6.*
Read, B.J.; WWW in an Open Office System. International Seminar on Client/Server Computing. Seminar Proceedings (Digest No. 1995/184), IEE Colloquium on , vol. 1, Oct. 30-31, 1995. pp. 16/1-16/5 vol. 1.*
Burns, Roger; ADMIN: Length limits. Google Group alt.med.cfs. Sep. 11, 1996.*
Tracer, Bach. Complete Address Traces! Google Group comp.os.reseearch. Dec. 27, 1991.*
Karwin, Bill. Re: Help Interbase 5.1. Google Group intebase.public.general. Feb. 5, 1999.*
McMurtrie, Kevin. Re: Length limit on query string? Google Group comp.infosystems.www.authoring.cgi. Jan. 1, 2002.*
Postel, Jonathan B. RFC 821 (RFC821). Information Sciences Institute, University of Southern California. Aug. 1982.*
Finseth, C. RFC 1492 (RFC1492). Network Working Group. Jul. 1993.*
Tzerefox, P.; Smythe, C.; Stergiou, I.; Cvetkovic, S. A Comparative Study of Simple Mail Transfer Protocol (SMTP), Post Office Protocol (POP) and X.400 Electronic Mail Protocols. Local Computer Networks, Nov. 1997. pp. 545-554.*
Crocker, D.H.; "RFC 822—Standard for the Format of ARPA Internet Text Messages." www.faqs.org/rfcs/rfc822.html Aug. 13, 1982.*
IBM-TDB-ACC-NO: NN8808174—"Simple Mail Transfer Protocol and Sockets on SNA"; IBM Technical Disclosure Bulletin, Aug. 1988, US; vol. 31, Issue 3, p. 174; Aug. 1, 1988.*
IBM-TDB-ACC-NO: NN9111110—"Cover Page Technique for an IBM-X.400 Gateway"; IBM Technical Disclosure Bulletin, Nov. 1991, US; vol. 34, Issue 6, pp. 110-112; Nov. 1, 1991.*
Postel, Jonathan B.; RFC 821 (RFC821); Information Sciences Institute, University of Southern California; Aug. 1982.*

* cited by examiner

```
greeting:   'r' 's' 'm' 't' 'p' ' ' role ' ' DOMAIN '\n';
role:       't' | 'r';

envelope:   'i' '\n' | 'i' ADDRESS ' ' numb ' ' notify '\n' 'm' NON_NL '\n'
                optext 's' ADDRESS '\n' rcpts '\n';
notify:     'n' | 'z' | 'b' | 'c';
optext:     | LETTER NON_NL '\n' optext;
rcpts:      't' ADDRESS '\n' | 't' ADDRESS '\n' rcpts;

envstatus:    optextrepl rcpstats sendstatus '\n';
optextrepl:   | optext '\n';
rcpstats:     rcpstat '\n' | rcpstat '\n' rcpstats;
rcpstat:      msgstat | rcpreject NON_NL;
rcpreject:    'n' | 'f';

sendstatus:   'Y' | 'R' numb ' ' NON_NL | sendreject NON_NL;
sendreject:   'N' | 'F';

message:    fragment | fragment message;
fragment:   numb '\n' ANYBYTES '.';
msgstatus:  msgstat '\n';
msgstat:    'y' | 'r' numb ' ' NON_NL;
numb:       digit | digit numb;
digit:      '0' | '1' | '2' | '3' | '4' | '5' | '6' | '7' | '8' | '9';
```

FIG. 1

REALLY SIMPLE MAIL TRANSPORT PROTOCOL

RELATED APPLICATIONS

This application is based on a Provisional Application, Ser. No. 60/178,597, filed on Jan. 28, 2000, entitled "Really Simple Mail Transfer Protocol."

FIELD OF THE INVENTION

This invention relates to protocols for sending electronic mail messages between networked computers.

BACKGROUND OF THE INVENTION

With the rapid growth of the Internet globally, the current protocols for the delivery of electronic mail (e-mail) on the Internet have become increasingly ill equipped to handle the demands of non-English using users and users wanting to e-mail file attachments. There are three prevalent standard protocols which govern Internet e-mail: The Simple Mail Transport Protocol (SMTP, defined in the Internet Architecture Board's Request for Comments (RFC) 821), which is a standard for the exchange of mail between two computers and specifies the protocol used to send mail between TCP/IP hosts; MAIL, a standard on the format of the mail messages; and DNS-MX, a standard for the routing of mail using the Domain Name System.

The SMTP protocol dictates that data sent via SMTP can only be 7-bit ASCII data, with the high-order bit cleared to zero. This is adequate in most instances for the transmission of English text messages, but is completely inadequate for non-English text or non-textual data. There are two prevalent approaches to overcoming these limitations: Multipurpose Internet Mail Extensions (MIME), which specifies a mechanism for encoding text and binary data as 7-bit ASCII within the mail envelope defined by MAIL (contained in RFC 822); and SMTP Service Extensions ("ESMTP"), which define mechanisms to extend the capabilities of SMTP beyond the limitations imposed by RFC 821.

There are three current RFCs which describe ESMTP. RFC 1651 sets a standard for a receiver-SMTP to inform a sender-SMTP which service extensions it supports. RFC 1651 modifies RFC 821 to allow a client SMTP agent to request that the server respond with a list of the service extensions that it supports at the start of an SMTP session. If the server SMTP does not support RFC 1651 it will respond with an error and the client may either terminate the session or attempt to start a session according to the rules of RFC 821. If the server does support RFC 1651, it may also respond with a list of the service extensions that it supports. It is clear that this method creates problems of compatibility and its usefulness is limited unless the servers involved supports the needed service extensions.

The next two RFCs define specific extensions. RFC 1652, entitled *SMTP Service Extension for 8 bit-MIMEtransport*, attempts to supplement the MIME approach for sending 8-bit content. RFC 1652 is a protocol for 8-bit text transmission which allows an SMTP server to indicate that it can accept data consisting of 8-bit bytes. A server which reports that this extension is available to a client must leave the high order bit of bytes received in an SMTP message unchanged if requested to do so by the client. The MIME standard allows messages to be declared as consisting of 8-bit data rather than 7-bit data. Such messages cannot be transmitted by SMTP agents which strictly conform to RFC 821, but can only be transmitted when both the client and the server conform to RFCs 1651 and 1652. Whenever a client SMTP attempts to send 8-bit data to a server which does not support this extension, the client SMTP must either encode the message contents into a 7-bit representation compliant with the MIME standard or return a permanent error to the user. Further, this service extension does not permit the sending of arbitrary binary data because RFC 821 defines the maximum length of a line which an SMTP server is required to accept as 1000 characters. Non-text data could easily have sequences of more than 1000 characters without a Carriage Return/Line Feed (CRLF) sequence. Finally, this service extension specifically limits the use of non-ASCII characters (those with values above decimal 127) to message bodies. Non-ASCII characters are not permitted in RFC 822 message headers.

The third SMTP Service Extension, RFC 1653, is a protocol for message size declaration. It allows a server to inform a client of the maximum size message it can accept. Without this extension, a client can only be informed that a message has exceeded the maximum size acceptable to the server (either a fixed upper limit or a temporary limit imposed by a lack of available storage space at the server) after transmitting the entire message. When this happens, the server discards the failing message. If both client and server support the Message Size Declaration extension, the client may declare an estimated size of the message to be transferred and the server will return an error if the message is too large.

Each of these SMTP Service Extensions is a draft standard protocol and each has a status of being elective, resulting in spotty and inconsistent implementation by users. Further, these are merely ad-hoc extensions to the existing SMTP standard, and many inherent problems and shortcomings of SMTP is merely masked.

It is an object of the current invention to disclose a mail transport protocol which is faster, simpler, more efficient and streams data better than SMTP, and which handles binary and Unicode better than existing methods.

SUMMARY OF THE INVENTION

A novel mail transport protocol is disclosed for use over a reliable byte-stream transport such as TCP or ATM AAL5, called the Really Simple Mail Transport Protocol (RSMTP). RSMTP has the following features: It takes fewer communication round trips between servers (i.e., pairs of "stop-and-wait" or "turnarounds") per message transferred than existing methods. It transmits and receives byte data as-is without requiring further per-byte processing on advanced operating systems such as UNIX, and requires only new-line processing in text on legacy operating systems. It presents a true 8 bit channel for data transmission, so MIME Content-Transfer-Encodings are not needed or permitted. It imposes no line-length limits. It permits and encourages the suppression of duplicate messages, enabling system operators to handle unwanted mass e-mailings effectively. It permits and requires the implementation of loop detection (a system connecting to itself). It permits and encourages "short-circuit" delivery by the sender if sender and receiver share a "message store" (i.e., the sender and receiver's mailboxes reside on the same physical server). It eliminates the security and privacy loopholes of SMTP's vrfy and expn commands, which were meant for diagnosing mail delivery problems. For example, a potential mass junk e-mail sender can test whether the addresses on his list are valid (VRFY) and even get more addresses (EXPN). Finally, RSMTP subsumes the Internet Network News Transfer Protocol (NNTP) used for Internet Usenet Newsgroups.

RSMTP has numerous advantages over SMTP. RSMTP requires fewer round trips between the servers by using a simpler and more efficient protocol. RSMTP dispenses with many of SMTP's archaic requirements: the need for stripping high bits down to 7 bits, the need for dot transformation (e.g, if the first character of a line is a period, SMTP will insert one additional period at the beginning of the line), the need to stuff and un-stuff carriage returns, and the need to fold the case of alphabets. In RSMTP, CR/LFs are not required and their use are discouraged. Since RSMTP does not require per-byte crafting as SMTP does, it has higher performance, greater simplicity and less chance for confusion, particularly during the transmission of messages where neither party is aware of the structure of the message. RSMTP would simple transmit the bytes en masse.

Similarly, RMSTP is superior to the patchwork of SMTP extensions ("ESMTP"). ESMTP retains SMTP's hard to decipher reply codes, the complex syntax requiring micromanagement of the system, the ambiguous specification of message responsibility hand-off, and has no specified means of e-mail loop detection. In addition, ESMTP must negotiate which extensions it may use on the wire. If negotiations fail and encoding of the message is needed, ESMTP will transmit appreciably more bytes than sending the unencoded message via RSMTP. Given an unencoded MIME message, RSMTP guarantees a clear 8-bit channel and has no need for encoding.

A protocol round trip is the full cycle of T sending data, stopping and waiting for R to reply, R sending back a reply and stopping and waiting for T. (Each individual "stop-and-wait" is also called a "line turnaround".) Let m be the number of messages T tries to send in a single connection, s be the number actually sent (s<=m) and r be the total number of recipients in all those messages. RSMTP takes fewer protocol round trips than SMTP: RSMTP takes m+1 round trips, at most, per connection compared with 2m+s+r+2½ in SMTP. For example, RSMTP takes 2 round trips versus 5½+r in the simple case of a successful session transferring only a single message. This leads to fewer packets sent and less delay. In fact, due to the asynchronous nature of RSMTP, it is possible that each party will find the data it needs to read next already waiting for it in protocol stack buffers because the other party sent it in advance of need.

A benefit of RSMTP needing at most one protocol round trip per message, as opposed to the greater number needed for SMTP and ESMTP, is that it minimizes the latencies in the hosts or the networks involved, which are amplified by round trips.

BRIEF DESCRIPTION OF THE DRAWINGS

The invention will be further described with reference to the accompanying drawings, wherein:

FIG. 1 shows the grammar of a complete conversation between servers to transmit a single message in FIG. 2 shows Flow of control, data & actions in an RSMTP conversation.

DETAILED DESCRIPTION OF THE INVENTION

Figure 2:
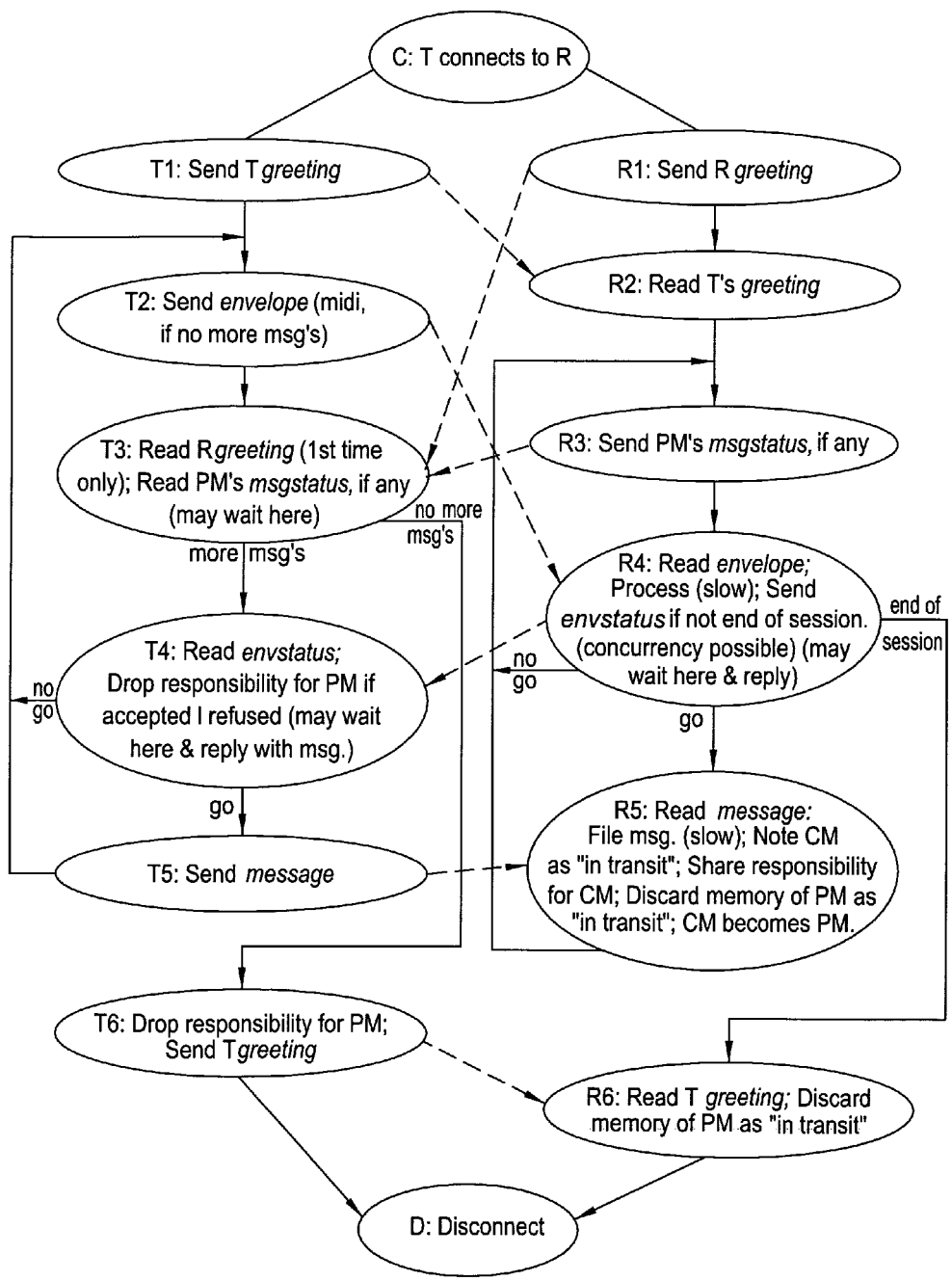

Referring to FIG. 1, the Backus-Naur form (BNF) grammar of a complete conversation to transmit a single message via RSMTP is shown in yacc notation. RSMTP encloses Literal Characters in quotes, and C language escape codes are honored. Alternatives are separated by vertical bars. ANYBYTES is any sequence of zero or more bytes. NON_NL is any sequence of zero or more non-newline characters. DOMAIN is an Internet domain, ADDRESS is normally an Internet mail address (a mailbox in RFC 821 terms); both are currently defined by RFC 821 and amended by later RFCs ^18, 28, 9, 10, 19, 20, 22, 15, notably the hosts requirements of RFCs ^6, 7. LETTER is any Unicode^8, 1 letter, encoded as UTF-8^30, 31, and all Unicode characters with values above 8016 are assumed to be letters for this purpose.

Upon connection, the receiver sends a greeting; the transmitter replies with greeting and an envelope. If the envelope indicates the transmitter is done for this session, the call is over and both sides shut down; otherwise the receiver replies with envstatus. If the sendstatus is Y, the transmitter sends a message and the receiver replies with msgstatus. The process then starts over from the transmitter sending an envelope (without a greeting). In the non-message part of the conversation, lines end with a single newline character (128) and "linear whitespace" is permitted only where specified, and consists of a single space character (408) in each instance.

FIG. 2 shows the flow of an RSMTP conversation as it would be if the protocol were completely synchronous (i.e., "half-duplex"). In FIG. 2, solid lines indicate control, dashed lines indicate the flow of data, and italics indicate the protocol grammar rules as set forth in FIG. 1. One trip through the main loop transfers one message. The preferred implementation will be asynchronous ("full-duplex"), with both parties potentially having data in transit simultaneously. In the following discussion, the transmitter will be abbreviated "T" and the receiver "R". T might be referred to by others as the client and the R as the server. The "Current Message" is hereinafter abbreviated to "CM" and the "Previous Message within this session, if any, if sent" to "PM".

Upon connection to R's RSMTP port (Step C, FIG. 2; port 2390 is assigned by the IANA for TCP), R sends a single line greeting (Step R1, FIG. 2) containing the following strings, which are separated by a single space each: an RSMTP identification string ('rsmtp'), a role identifier ('r'), R's preferred (or "canonical") fully-qualified domain name (FQDN), and R's message store name (the FQDN of the message store, or set of mailboxes, that R answers for and stores received messages into). The message store name might be as fine-grained as the hostname of a single machine with its own unshared set of mailboxes or as broad as a departmental domain which contains a single message store shared via a network filesystem. If a domain, excluding it sub-domains, contains multiple stores, unless one of them is considered the canonical message store for the domain, then hosts within that domain, again excluding its sub-domains, should use fully-qualified hostnames as the message store names for RSMTP. The following would be three common configurations: a single Unix® machine with a local store; a cluster of machines with NFS mounts of the message store; and a gateway (possibly with no store). These are orthogonal; one could have a gateway with a local or imported store that forwards mail destined for other stores.

At any time during the connection, if either party detects loss of synchronization with the other, it would drop the connection. In order to implement a two-phase commit, the usual graceful end to an RSMTP conversation is for T to drop the connection after sending its greeting. Envelope addresses are per RFC 821, as modified by later RFCs.

Messages are per RFC 822, minus the CRs, and the many MIME RFCs, notably the defining ones^ 11, 12, 23, 13, 14. The bodies of text messages or textual parts of multipart MIME messages should be in the Unicode character set, encoded as UTF-8, as recommended by the IAB^29, and must contain no carriage returns. The rest of the conversation (the envelope) is in UTF-8.

At R's response, T responds with a similar greeting line (Step T1, FIG. 2), containing T's domains and the role identifier 't'. If R's preferred FQDN is exactly T's preferred FQDN, T has connected to itself somehow, which is an error. Left undetected, a mail system could forward mail through itself endlessly in this situation. Similarly, if R's message store name is exactly T's message store name, they share a message store and thus R can deliver the message directly into its local message store and avoid sending it to T, thereby conserving local network bandwidth. This is what is called a "short-circuit" local delivery.

Before T sends a message, it would know the disposition of the PM, if there is any. Once R reads the message T just sent, R would know that T has knowledge of the disposition of any PM, so if R has accepted and successfully received the PM, then T, once it has sent its CM, is no longer responsible for delivery of the PM (if any) to the recipients. R accepted (shared) responsibility when it sent back the message-reception status; once R has read the message T just sent (the CM), R knows that it has sole responsibility for any PM.

At this point, T can send an end-of-session envelope (a single line containing just 'i'), read the reception status of PMs, send a greeting, flush its output buffers, and drop the connection. This sequence will be interpreted by R as a proper termination of the conversation.

To proceed to the transmission of messages, T sends an envelope (Step T2, FIG. 2), which starts with a line identifying the next message and containing these strings, separated by a single space each: 'i' and a globally-unique string (a message-id, though not necessarily and RFC 821 or 822 Message-ID; syntactically an ADDRESS); the exact byte count of the number of bytes of the message about to be sent, and an indicator of a request for delivery notification. In the normal case, only negative delivery reports (message "bounces") and automatically-generated responses ("vacation messages") are to be returned to the sender. For mailing list cases, no delivery reports will be returned. For automated mailing list cases, only negative delivery reports are to be returned to the sender, presumably for automatic processing such as deleting users whose mail consistently bounces. It is, of course, possible to set up the system so that all delivery reports, positive, negative, indifferent, and automatically-generated are to be returned to the sender.

It is R's responsibility to generate these delivery reports (positive ones upon local delivery and negative ones upon any permanent failure) and pass the obligation on to the next system if the message is forwarded. If the RSMTP obligation can't be passed on with the message (e.g., the messages is to be forwarded via SMTP), R must generate a negative delivery report noting that it cannot be responsible for any further delivery reports for this message. Note that these delivery reports are distinct from "read receipts" generated by mail-reading software.

R is expected to compare the size in bytes transmitted in the envelope with its free file system space and refuse a message if there is too little file system space to have a reasonable chance of receiving the message. (An "end-of-session" envelope is a single line containing just 'i'.) In normal (non-end-of-session) envelopes, the next line sent contains an 'm' and the message's MIME Content-Type. The preferred Content-Type for ordinary text is 'text/plain; charset=UTF-8'. It then sends zero or more lines of protocol extension (optest), the contents of which are not yet defined, except that each line must begin with a letter not used as an initial letter in envelope exchanges by either party in this specification for the purposes of uniqueness.

T then sends a line consisting of 's' and the sender address. If this address is empty, no failure notifications or vacation messages are to be returned. T then sends the list of recipients, one per line (rcpts). Each line consists of 't' and a recipient address. The list of recipients, and the envelope itself, is terminated by sending a single empty line.

Next, R sends the envelope status (envstatus), which starts with zero or more lines of protocol extension replies (optextrepl), the contents of which are not yet defined, but each line of which begins with the same letter as the corresponding protocol extension request line (Step R4, FIG. 2). These responses appear in the same order as the corresponding requests. R reads and waits for the envelope T just sent. R then sends the status for each recipient (rcpstats), one per line, in the same order as T sent the list of recipients. The first character of each rcpstat is one of the following: 'y' for a valid recipient; 'n', followed by a reason for a duplicate recipient or other no-op recipient that will be ignored by R; 'f', followed by a reason that this user will never be acceptable (e.g., no such user); or 'r', followed by a suggested retry delay in seconds, a space, and a reason for the temporary failure (e.g., mail forwarding file is damaged).

R then sends a proceed/don't proceed indicator for the whole message (sendstatus) on its own line: 'Y' for "go ahead and send"; 'N', followed by a reason; for "don't send; a no-op" (e.g., this message is a duplicate); 'F', followed by a reason, for "don't send; there's something wrong with this message (e.g., no valid recipients); and 'R', followed by a suggested retry delay in seconds, a space, and a reason for a temporary failure (e.g., the disk is full). T reads R's greeting for only the first time through, but T always reads the PM's reception status (msgstat) and CM's envstatus.

The list of recipients of envelope and the list of recipient statuses envstatus may both be quite long. The asynchronous setup of RSMTP can help avoid stopping and waiting. T may send all of envelope and then read all of envstatus, but this will produce locked-step stop-and-waits. Likewise, R may read the entire envelope then send all of envstatus. The preferred implementation is that both parties send and receive whenever possible. If there is protocol stack buffering, each side should attempt to send any queued data for the other while also attempting to read and process any data that arrives. Validating addresses can take a little while for R to perform, so T is likely to get ahead of R during envelope transmission. In the preferred implementation, with R incrementally processing recipient addresses, T should read the final recipient's status from R shortly after sending the final recipient address to R, and T should be able to start sending message (assuming sendstatus was Y) and the envelope of the next message, if any, immediately.

If, and only if, R sends back a message status of 'Y' ("proceed"), will the actual message transmission be performed (Step R4, FIG. 2). T proceeds to send the entire message (Step T5, FIG. 2), including RFC 822 headers, but does not send the carriage returns in text. The raw unmodified data of a message is sent in framed fragments. There must be at least one fragment. Each fragment consists of a decimal byte count of the number of data bytes in the fragment, a newline character, the data bytes (the number of which is specified by the decimal byte count) and the synchronization pattern ('.', a single dot, with no newline character following it). The final fragment of a message is zero-length, consisting of the bytes 00 (in C language string notation). This message should be of the size (in bytes) and MIME Content-Type promised in the envelope. The size may only be an estimate if the message is being generated on the fly and its size is not known in advance. Messages must end with a newline character if the body is textual.

In Step R5, R receives and reads the message, then sends back a final message reception status (msgstatus) as a single line: 'y' if successfully received, or 'r' and a suggested retry delay in seconds, a space and a reason (e.g., disk filled during reception). When R sends the delivery status, it knows the disposition of the CM (received successfully or unsuccessfully). If the message was successfully received, even if the connection drops before the next greeting exchange can complete, R would take responsibility for the message and process it. When T receives and reads the delivery status, it will also know the disposition.

The whole process may now start over for a new message by beginning the handing off of message delivery responsibility. T's CM becomes its PM, and R would discard any records in memory of the PM as being "in transit".

Under RSMTP, both parties have reliable knowledge of the completeness of delivery. T initially is responsible for delivery of a message. There exists a window in the greeting exchange and envelope transmission in which a dropped connection may cause disagreement about responsibility for delivering any prior message (both parties may briefly claim it). To eliminate the possibility of duplicate messages being sent due to this window, R would retain a history in permanent storage of messages in transmit and refuse receipt of duplicate messages by its message id number. More history could optionally be retained to prevent duplicates as a result of a transmitting system restarting after a system crash.

It is expected that, at least initially, Internet addresses used in RSMTP will typically be resolved in the same manner as for SMTP: DNS lookup of MX records for the destination domain, followed by DNS lookup of A records for the domains in the MX records (or the destination domain itself if it has no MX records), followed by connecting to each of the resulting IP addresses and attempting delivery until successful connection and delivery, or rejection. Some sites may wish to resolve addresses differently, and cooperating sites may use other forms of address or resolution. RSMTP is agnostic about addressing. One possibility is to connect to the TCP MUX^21 port (TCP port 1), or some similar service, and ask the mail redirector service where mail should be delivered.

All output in the preferred RSMTP implementation should be buffered and flushed at line turnarounds (notably after steps T2, T6, R1 and R4 in FIG. 2) so that, after the initial 'rsmtp r' line at the start of a session, each message transferred involves a minimum number of packets and round trips: one half round trip consisting of a message, if any, and the next message's envelope, and a second half trip consisting of message status and the next message's envelope status.

In the preferred implementation, both parties can be sending data at the same time, so to avoid the possibility of deadlock caused by exhausting the buffering in the sending and receiving protocol stacks, one may need to use Unix's select(2) or multiple processes. In particular, R can deadlock reading recipient addresses and writing statuses of same in one process if T is also single-threaded.

To encourage the adoption of RSMTP, it may be worthwhile for mail systems to attempt a connection by default to a remote machine's RSMTP port for a few seconds and fall back to using SMTP if there is no quick connection, unless it is known a priori that that machine does not listen for RSMTP.

It will be appreciated that the instant specification and claims set forth by way of illustration and not limitation, and that various modifications and changes may be made without departing from the spirit and scope of the present invention.

What is claimed is:

1. A process for the transmission and reception of electronic mail between computer servers over reliable byte-stream transports, comprising the steps of:
    a transmitter connecting to a receiver;
    the receiver sending a greeting to the transmitter;
    the transmitter replying to the receiver with a greeting and an envelope, wherein the envelope comprises message information associated with a message scheduled to be transmitted from the transmitter to the receiver, wherein the message information includes at least one scheduled message recipient;
    the receiver replying to the transmitter with an envelope status, comprising a recipient status associated with each of the at least one scheduled message recipient;
    the transmitter receiving the envelope status and sending the message; and
    the receiver receiving the message and replying with a message status;
    wherein transmission of at least a portion of the envelope from the transmitter to the receiver is contemporaneous with transmission of at least a portion of the envelope status from the receiver to the transmitter.

2. The process of claim 1, further comprising the steps of:
    the receiver receiving a complete message,
    the receiver discarding records of the status of the previous message as being in transit; and
    the transmitter sending a new envelope without a greeting to the receiver.

3. The process of claim 1, wherein the transmission and reception of electronic mail is carried over a S bit channel.

4. The process of claim 1, wherein the transmission and reception of electronic mail imposes no line-length limits on the messages.

5. The process of claim 1, wherein duplicated messages are suppressed.

6. The process of claim 1, wherein loop detection is implemented.

7. The process of claim 1, wherein Carriage Returns and Line Feeds in a message body is not required.

8. The process of claim 1, wherein the transmission of data between transmitter and receiver is asynchronous.

9. The process of claim 1, wherein if the transmitter detects loss of synchronization with the receiver, the transmitter will drop the connection with the receiver.

10. The process of claim 1, wherein if the receiver detects loss of synchronization with the transmitter, the receiver will drop the connection with the transmitter.

11. The process of claim 1, wherein the message is transmitted and received as raw unconverted data.

12. A process for transmission and reception of electronic mail between a transmitter and a receiver, wherein the transmitter is adapted for performing a method comprising:
    sending an envelope to the receiver, wherein the envelope comprises message information associated with a message scheduled to be transmitted from the transmitter to the receiver, wherein the message information includes at least one scheduled message recipient;

receiving an envelope status from the receiver, wherein the envelope status comprises a recipient status associated with each of the at least one scheduled message recipient;

sending the message to the receiver according to the envelope status; and receiving a message status associated with the message transmitted from the transmitter to the receiver;

wherein transmission of at least a portion of the envelope from the transmitter to the receiver is contemporaneous with transmission of at least a portion of the envelope status from the receiver to the transmitter.

13. A process for transmission and reception of electronic mail between a transmitter and a receiver, wherein the receiver is adapted for performing a method comprising:

receiving and processing an envelope from the transmitter, wherein the envelope comprises message information associated with a message scheduled to be transmitted from the transmitter to the receiver, wherein the message information includes at least one scheduled message recipient;

replying to the transmitter with an associated envelope status comprising a recipient status associated with each of the at least one scheduled message recipient;

receiving the message from the transmitter;

generating a current message status in response to receiving the message from the transmitter; and transmitting the current message status towards the transmitter;

wherein transmission of at least a portion of the envelope from the transmitter to the receiver is contemporaneous with transmission of at least a portion of the envelope status from the receiver to the transmitter.

* * * * *